(12) United States Patent
Ritchey

(10) Patent No.: US 7,762,214 B2
(45) Date of Patent: *Jul. 27, 2010

(54) DOG TOY WITH CONCEALED CLOSURE TO MINIMIZE CHEWING OF AND DAMAGE TO ANIMAL TOY

(76) Inventor: Sharon A. Ritchey, P.O. Box 28726, Scottsdale, AZ (US) 85255

(*) Notice: Subject to any disclaimer, the term of this patent is extended or adjusted under 35 U.S.C. 154(b) by 75 days.

This patent is subject to a terminal disclaimer.

(21) Appl. No.: 11/809,220

(22) Filed: May 31, 2007

(65) Prior Publication Data
US 2008/0098964 A1 May 1, 2008

Related U.S. Application Data

(63) Continuation-in-part of application No. 11/588,723, filed on Oct. 27, 2006.

(51) Int. Cl.
*A01K 29/00* (2006.01)
(52) U.S. Cl. ........................ 119/707; 119/710; 119/711
(58) Field of Classification Search ................ 119/707, 119/711, 702, 708, 709, 710; D30/160; 473/576
See application file for complete search history.

(56) References Cited

U.S. PATENT DOCUMENTS

| | | | | |
|---|---|---|---|---|
| 4,657,253 A * | 4/1987 | Lerner et al. | ................ | 473/576 |
| 4,770,123 A * | 9/1988 | Bell | ............................ | 119/709 |
| 4,867,451 A * | 9/1989 | Mitchell | ...................... | 473/576 |
| 5,538,456 A * | 7/1996 | Liu et al. | ..................... | 446/473 |
| 5,560,320 A * | 10/1996 | Plunk | .......................... | 119/709 |
| 5,782,207 A * | 7/1998 | Goodham | .................... | 119/707 |
| 6,083,128 A * | 7/2000 | Young et al. | ................. | 473/576 |
| 6,688,258 B1 * | 2/2004 | Kolesar | ...................... | 119/710 |
| 7,343,878 B2 * | 3/2008 | Ritchey et al. | .............. | 119/707 |
| 7,389,748 B2 * | 6/2008 | Shatoff et al. | ............... | 119/707 |
| RE40,430 E * | 7/2008 | Markham | .................... | 119/707 |
| 2004/0200433 A1 * | 10/2004 | Oblack | ........................ | 119/707 |
| 2005/0066911 A1 * | 3/2005 | Lubeck | ........................ | 119/709 |
| 2005/0284409 A1 * | 12/2005 | Ritchey et al. | .............. | 119/707 |
| 2006/0260560 A1 * | 11/2006 | Renforth et al. | ............. | 119/707 |
| 2007/0215063 A1 * | 9/2007 | Simpson | ..................... | 119/708 |
| 2007/0234969 A1 * | 10/2007 | Lynch | ......................... | 119/707 |
| 2007/0245976 A1 * | 10/2007 | Ritchey et al. | .............. | 119/709 |
| 2007/0261644 A1 * | 11/2007 | Simon | ......................... | 119/707 |
| 2008/0201881 A1 * | 8/2008 | Dunn et al. | ................... | 15/106 |

* cited by examiner

*Primary Examiner*—Yvonne R. Abbott
(74) *Attorney, Agent, or Firm*—Tod R. Nissle, P.C.

(57) ABSTRACT

A toy for an animal, in particular a dog, includes a bag or other hollow container. The bag has a mouth for inserting articles in the bag. After an article is inserted in the bag, a closure is utilized to secure and close the mouth. The closure and mouth of the bag are inserted in a ball to prevent an animal from chewing on the closure to open the mouth of the bag.

3 Claims, 3 Drawing Sheets

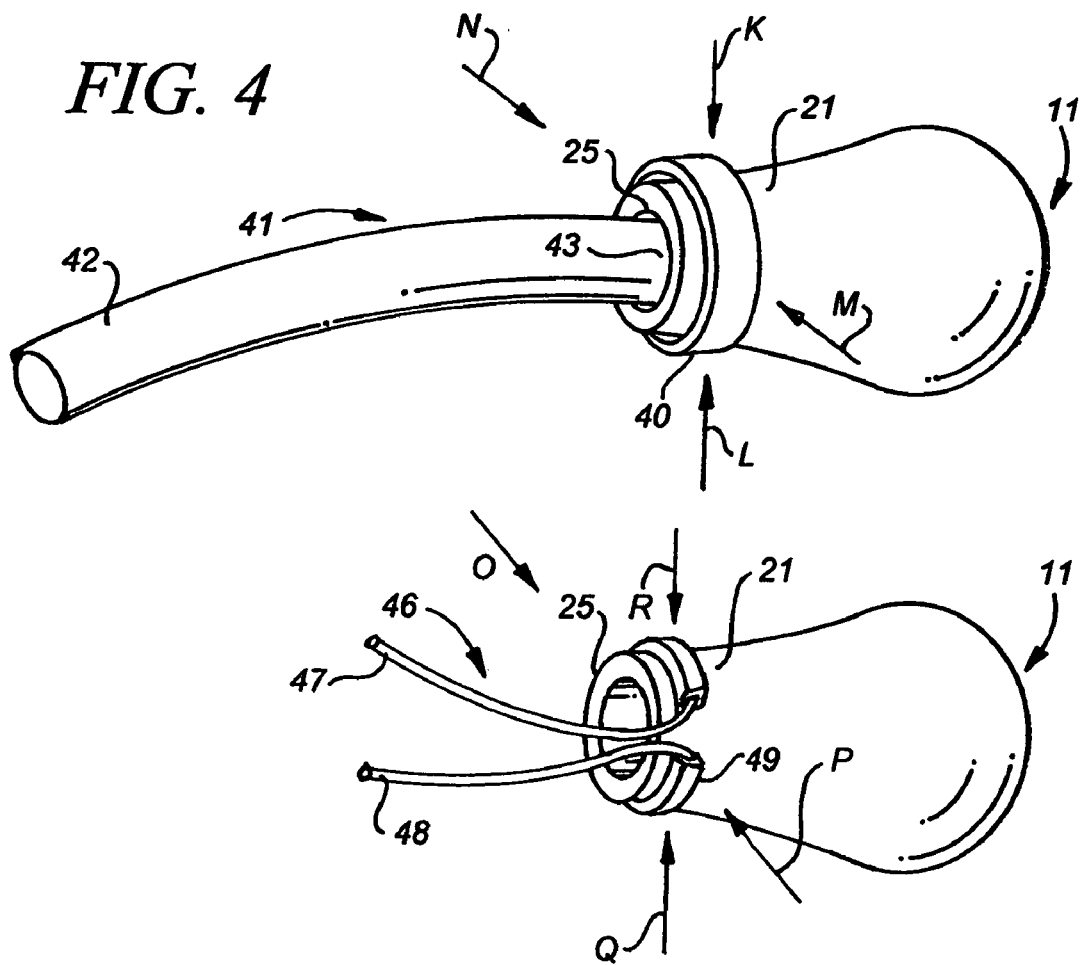

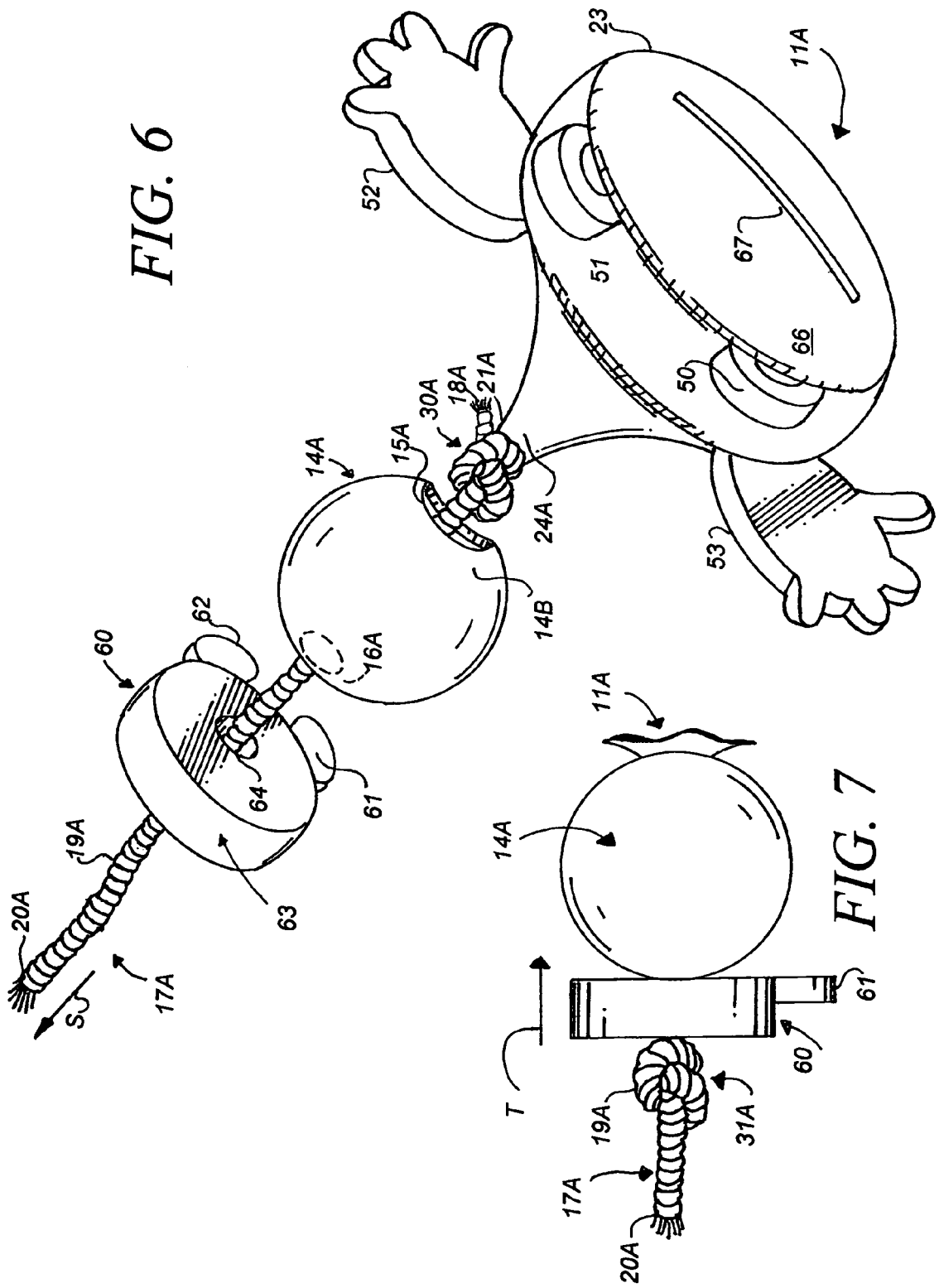

DOG TOY WITH CONCEALED CLOSURE TO MINIMIZE CHEWING OF AND DAMAGE TO ANIMAL TOY

This is a continuation-in-part of application Ser. No. 11/588,723 filed Oct. 27, 2006.

This invention relates to animal toys.

More particularly, the invention relates to a dog toy that minimizes the likelihood that an animal will chew on and damage a toy.

Many toys are provided with, or include, VELCRO fasteners, rope ties, or other closures to secure openings in the toys. Dogs often use the sense of touch in their mouth and nose to locate such openings and closures. For example, hook and loop closure toys have a hard edge feel which allows a dog to locate the opening that is held closed by hook and loop fastener material. Once a dog locates the opening in a toy, the dog may pull and chew on the closure and opening, successfully open the closure, and remove the contents (if any) of the toy. The contents can comprise stuffing, squeakers, or other articles of varying size and composition.

Accordingly, it would be highly desirable to provide an improved animal toy that would reduce the risk that a dog chewing on and damaging the toy.

Therefore, it is a principal object of the invention to provide an improved animal toy.

Another object of the invention is to provide an improved animal toy that limits access to and makes it difficult for a dog to locate a VELCRO fastener, rope tie, or other closure used on a toy.

These and other, further and more specific objects and advantages of the inventions will be apparent to those skilled in the art from the following detailed description thereof, taken in conjunction with the drawings, in which:

FIG. 4 is a side view illustrating another alternate construction of a closure portion of the toy of FIGS. 1 and 2;

FIG. 5 is a side view illustrating still another alternate construction of a closure portion of the toy of FIGS. 1 and 2;

FIG. 6 is a perspective view illustrating another embodiment of the invention; and, FIG. 7 is a side view of a portion of the invention of FIG. 6 illustrating the mode of operation thereof.

Briefly, in accordance with my invention, I provide an improved toy for an animal. The toy comprises a hollow housing with at least one aperture formed therethrough; a hollow pocket tail with a bottom, a top, and an opening formed in the top, the tail removably mounted on the housing such that the bottom extends out through the aperture with the top and the opening housed inside the ball; and, a play object in the tail detectable by one of the senses of the animal.

In another embodiment of the invention, I provide an improved method for making an animal toy. The method comprises the steps of providing a hollow housing including at least one aperture and an inner area; providing a hollow pocket tail including a bottom, a top, a mouth formed in the top, and an elongate member attached to the top; inserting the elongate member through the aperture; and, tensioning the elongate member to pull the top and mouth through the aperture into the inner area of the housing.

In a further embodiment of the invention, I provide an improved toy for an animal. The toy comprises a hollow housing with at least a first aperture formed therethrough; a hollow pocket tail with a bottom extending outwardly from the housing and a pliable top and a mouth formed in the top inside the housing; a play object inserted through the mouth into the tail and detectable by one of the senses of the animal; and, an elongate mouth closure attached to the pocket substantially evenly circumferentially tensioning and drawing closed said mouth.

Figure 1:
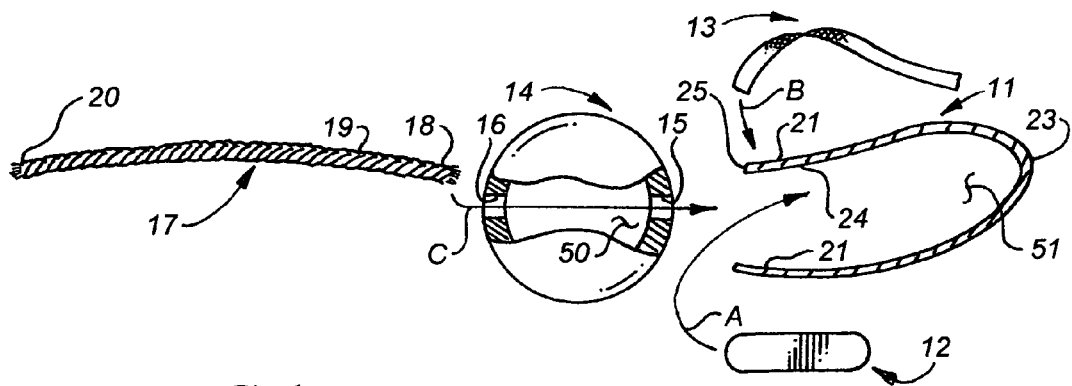
FIG. 1 is an exploded, partial section view illustrating an animal toy constructed in accordance with the invention.
Figure 2:
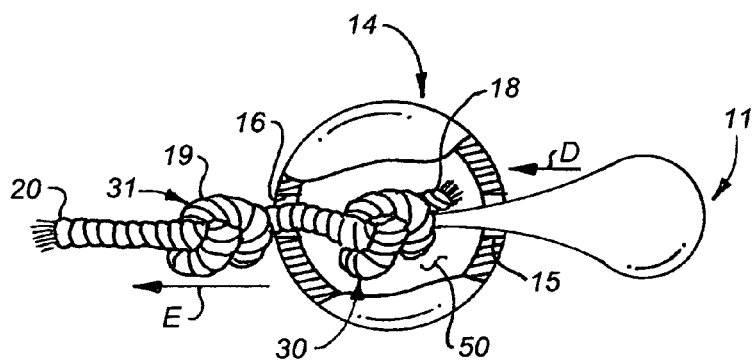
FIG. 2 is a partial section view illustrating the toy of FIG. 1 assembled.

Turning now to the drawings, which depict the invention for purposes of explanation and not by way of limitation of the invention, and in which like reference characters refer to corresponding elements throughout the several views, FIGS. 1 and 2 illustrate a toy constructed in accordance with the invention and including a hollow ball 14 or other hollow housing with at least one aperture 15, 16 formed therein. The shape and dimension of the hollow volume inside ball 14 can vary as desired and can comprise a large portion, a small portion, etc. of the total volume of ball 14. The materials and methods utilized to produce a housing 14 can vary as desired. By way of example, and not limitation, a housing 14 can include one or more layers or segments or pieces of the same or differing material.

A hollow, preferably pliable, pocket tail 11 or other hollow member includes a bottom 23, a top 24, and a mouth or opening 25 formed in top 24. Top 24 includes circumferential neck 21. The shape and dimension of the hollow volume inside tail 11 can vary as desired and can comprise a large portion, a small portion, etc. of the total volume of tail 11. Tail 11 can, if desired, be covered with fur or other materials, and can comprise one or more layers or segments or pieces of the same or differing material. Tail 11 is presently preferably, but not necessarily, soft.

Squeaker 12 or another toy or play object detectable by one of the senses of a dog (sight, touch, taste, smell, hearing) is, if desired, inserted through mouth 25 into pocket tail 11 in the manner indicated by arrow B in FIG. 1. Tape 13 is, if desired, wrapped about neck 21 to close top 24.

A further example of a play object inserted in hollow tail 11 comprises a MILKBONE™ that is detectable by a dog's sense of smell after the MILKBONE™ is inserted in tail 11.

Another example of a play object inserted in hollow tail 11 comprises a piece of foam that is detectable by a dog's sense of touch when the dog squeezes tail 11 with its mouth (and the foam piece inside tail 11) after the foam piece is inserted in tail 11.

Still another example of a play object inserted in hollow tail 11 consists of polyester fibers that are used to stuff or fill tail 11. After the fibers are inserted in tail 11, the presence of the fibers is detectable by a dog's sense of touch when the dog squeezes tail 11 in the dog's mouth, or, when the dog uses its paw or nose to press against tail 11.

End 18 of rope 17 or other closure is threaded through apertures 15, 16 in the manner indicated by arrow C in FIG. 1. End 18 is tied about closed top 24 to form knot 30. End 20 is pulled in the direction of arrow E (FIG. 2) to pull knot 30 and top 24 in the direction of arrow D through aperture 15 and into the interior 50 of ball 14. In FIG. 2, knot 30 is, for sake of clarity, depicted as being larger than aperture 15. As would be appreciated by those of skill in the art, knot 30 must be sized so it can pass or be pulled through aperture 15. If ball 14 is fabricated from an elastic, resilient material, it may be possible for knot 30 to be larger than aperture 15 because when knot 30 is pulled through aperture 15, aperture 15 elastically, resiliently expands to a greater size. Or, conversely, if knot 30 is comprised of a resilient material, it may stretch to a reduced size which permits knot 30 to fit through aperture 15.

Knot 30 is formed in end 18. After knot 30 and top 24 are pulled into the interior 50 of ball 14, an additional knot 31 can be tied in the intermediate portion 19 of rope 17 on the exterior of ball 14 to prevent knot 30 from being pulled from interior 50 outwardly through aperture 15 in a direction opposite that of arrow D. Knot 31 is sized so it will not fit through aperture 16.

When it is desired to remove top 24 from interior 50 outwardly through aperture 15, knot 31 can be untied. After top 24 is pulled outwardly through aperture 15, knot 30 can be untied and tape 13 removed from top 24 to allow access to the interior 51 of tail 11 so that squeaker 12 can be removed, so that a new squeaker or other toy can be inserted in interior 51 with or without squeaker 12, or so that all toys can be removed from interior 51 prior to closing and reinserting top 24 inside ball 14.

The shape and dimension of tail 11 can vary as desired and can, by way of example and not limitation, simulate one or more anatomical features and take on the shape of a head, leg, arm, or other body member or portion thereof.

Figure 3:
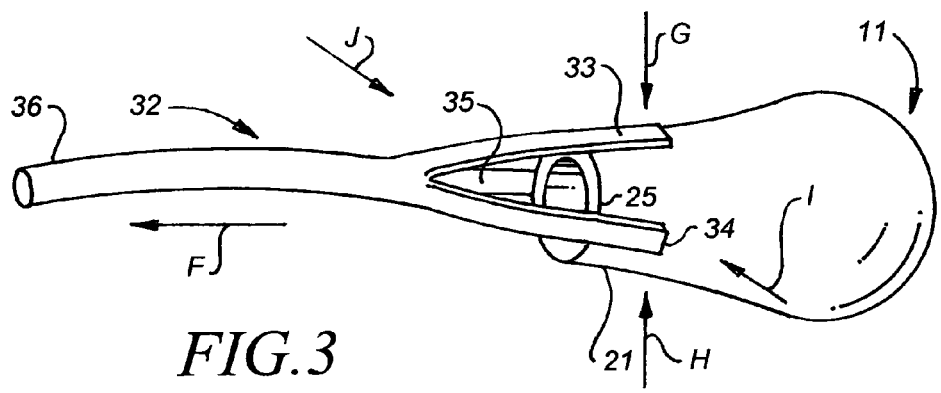
FIG. 3 is a side view illustrating an alternate construction of a closure portion of the toy of FIGS. 1 and 2.

An alternate closure method for pouch 11 is illustrated in FIG. 3. Instead of (or in addition to) utilizing tape 13 and knot 18, an closure 32 is provided which includes a plurality of elongate fingers 33, 34, 35 that are attached to top 24 at points circumferentially spaced about and attached to the outside (or inside) of neck 21. When end 36 of member 32 is pulled in the direction of arrow F, fingers 33 to 35 draw inwardly together and function to draw neck 21 inwardly to close mouth 25 in the manner indicated by arrows G, H, I and J. Consequently, this inward closure action by fingers 33 to 35 reduces the size of mouth 25 and neck 21 such that top 24 can be slidably drawn through aperture 15 into interior 50 when end 36 is being pulled through aperture 16 outwardly away from ball 14 in the direction of arrow F.

A further closure method for pouch 11 is illustrated in FIG. 4. End 43 of closure 41 is secured inside pouch 11 by tape 40, VELCRO™ hook and loop fastening material, or other fastening means that extends circumferentially around neck 21 and end 43, and inwardly presses neck 21 against end 43. End 43 can, if desired be stitched or otherwise fastened to neck 21 or tape 40. Tape 40 functions to displace neck 21 inwardly to close mouth 25 against end 43 in the manner indicated by arrows K, L, M and N. End 43 and tape 40 are sized and shaped and dimensioned such that the closed, or sealed, configuration of top 24 shown in FIG. 4 can, by drawing end 42 outwardly through aperture 16 (in a direction comparable to arrow E in FIG. 2), be pulled through aperture 15 into interior 50 of ball 14. Tape 40 preferably presses neck 21 against end 43 with substantially equal compressive forces each acting at one of the points extending about the circumference of neck 21.

Still another closure method for pouch 11 is illustrated in FIG. 5 and utilizes a closure comprising a drawstring 46 extending through a hollow pliable, foldable channel 49 that extends circumferentially about pliable, foldable neck 21. Pulling ends 47 and/or 48 outwardly away from mouth 25 functions to draw and fold channel 49 and neck 21 circumferentially inwardly to close mouth 25 in the manner indicated by arrows O, P, Q, R in FIG. 5. After neck 21 is circumferentially folded and closed by pulling ends 47 and 48, portions of ends 47 and 48 can be tied together to secure neck 21 in a closed configuration before top 24 is drawn through aperture 15 into interior 50 of ball 14.

FIGS. 6 and 7 illustrate another embodiment of the invention a hollow ball 14A or other hollow housing with at least one aperture 15A, 16A formed therein. The shape and dimension of the hollow volume inside ball 14A can vary as desired and can comprise a large portion, a small portion, etc. of the total volume of ball 14A. As noted earlier herein, the materials and methods utilized to produce a housing 14A can vary as desired.

A hollow, preferably pliable, pocket tail 11A or other hollow member includes a top 24A and a mouth or opening (not visible) top 24A. Top 24 includes circumferential neck 21A. The shape and dimension of the hollow volume inside tail 11A can vary as desired and can comprise a large portion, a small portion, etc. of the total volume of tail 11A. Tail 11A can, if desired, be covered with fur or other materials, and can comprise one or more layers or segments or pieces of the same or differing material. Tail 11A is presently preferably, but not necessarily, soft.

A squeaker (not visible) or another play object detectable by one of the senses of a dog (sight, touch, taste, smell, hearing) is, if desired, inserted through the mouth in top 24A and into pocket tail 11A in a manner similar to that indicated by arrow B in FIG. 1 in connection with tail 11 in FIG. 1. Tape 13 can, if desired, be wrapped about neck 21A to close top 24A.

End 18A of rope 17A or another closure is threaded through apertures 64, 15A, 16A and is tied about top 24A to form knot 30A in the manner illustrated in FIG. 6. End 20A is pulled in the direction of arrow S (FIG. 6) to pull knot 30A and top 24A in the direction of arrow S through aperture 15A and into the interior of ball 14A. When knot 30A and top 24A are pulled into the interior of ball 14A, the portion of tail 11A that is larger than opening 15A and that remains outside of ball 14A is typically, but not necessarily, snugly pulled and secured against the portion 14B of the outer surface of ball 14A that circumscribes and is adjacent opening 15A.

In FIG. 6, tail 11A includes a bottom 23 that is configured to simulate one or more anatomical features of the toy, namely a head 66 and arms 52, 53. Head 66 includes eyes 50, 51 and mouth 67. Arms 52 and 53 are attached to head 66.

After knot 30A and top 24A are pulled into the interior of ball 14A, member 60 is slid toward ball 14A in the direction of arrow T along the section 19A of rope intermediate ends 18A and 20A. Member 60 is preferably, but not necessarily, slid to a position adjacent and contacting ball in the manner illustrated in FIG. 7. A knot 31A is formed in section 19A. Knot 31A is larger than aperture 64 and functions to maintain member 60 in position against ball 14A. If desired, a know 31A need not be formed in rope 17A and a safety pin, slip, thread, or any other desired fastening means can be utilized to secure member 60 to ball 14A and/or rope 17A.

In the embodiment of the invention illustrated in FIG. 6, it is presently preferred, although not required, that member 60 also simulate one or more anatomical features of the toy. In FIG. 6, member 60 simulates the rear or back 63 of the toy and simulates the feet 61, 62 of the toy. Feet 61 and 62 are attached to cylindrically-shaped back 63. In FIG. 6, ball 14A also simulates an anatomical feature, i.e. the body, of the toy.

In an alternate embodiment of the invention, a first supplemental knot (not shown) is formed intermediate member 60 and ball 14A. This first supplemental knot contacts the portion of the exterior of ball 14A that is adjacent and circumscribes aperture 16A and functions to maintain knot 30A and top 24A inside ball 14A. Further, in this embodiment, a second supplemental knot is tied in section 19A of rope 17A and member 60 is positioned on rope 17A intermediate the first and second supplemental knots. Member 60 can be snugly maintained on rope 17A intermediate the first and second supplemental knots such that member 60 can not slid along rope 17A. Or, the first and second supplemental knots can be spaced apart a distance that permits member 60 to slide along rope 17A intermediate the first and second supplemental knots.

Having described my invention in such terms as to enable those of skill in the art to understand and practice the invention, and having described the presently preferred embodiments thereof, I Claim:

1. A method for making an animal toy, said method comprising the steps of
    (a) providing a hollow housing including at least one aperture and an inner area;
    (b) providing a hollow pocket tail including
        (i) a bottom,
        (ii) a top,
        (iii) a mouth formed in said top,
        (iv) a closure secured to said top;
    (c) inserting a play object in said tail; and,
    (d) tensioning said closure to pull said top and mouth through said aperture into said inner area of said housing.

2. A toy for an animal, said toy comprising
    (a) a hollow housing with at least a first aperture formed therethrough;
    (b) a hollow pocket tail with a bottom extending outwardly from said housing and a pliable top and a mouth formed in said top inside said housing;
    (c) a play object inserted through said mouth into said tail and detectable by one of the senses of the animal; and,
    (d) an elongate mouth closure attached to said pocket substantially evenly circumferentially tensioning and drawing closed said mouth.

3. A method for making an animal toy, said method comprising the steps of
    (a) providing a hollow housing including a first side with an aperture formed therethrough and a second side with an aperture formed therethrough;
    (b) providing a hollow pocket tail that simulates at least one anatomical feature and includes
        (i) a bottom,
        (ii) a top,
        (iii) a mouth formed in said top,
        (iv) a closure secured to said top;
    (c) providing a member that simulates at least one anatomical features and is shaped and dimensioned to slide along said closure;
    (d) inserting a play object in said tail;
    (e) inserting said closure through said first and second apertures and tensioning said closure
        (i) to pull said top and mouth through said apertures into said inner area of said housing to draw said hollow pocket tail against said first side of said housing, and,
        (ii) such that a portion of said closure extends through said second aperture outwardly away from said housing; and,
    (f) mounting said member on said portion of said closure extending outwardly away from said housing.

* * * * *